W. B. S. TAYLOR.

MANUFACTURE OF FLEXIBLE TUBING.

Reissued May 23, 1876.

No. 7,137.

Attest:

Jno. D. Patten

R. E. Grant.

Inventor:

W. B. S. Taylor by atty. Philo N. Bailey

UNITED STATES PATENT OFFICE.

WILLIAM B. S. TAYLOR, OF NEW YORK, N. Y.

IMPROVEMENT IN THE MANUFACTURE OF FLEXIBLE TUBING.

Specification forming part of Letters Patent No. 55,740, dated June 19, 1866; reissue No. 7,137, dated May 23, 1876; application filed May 11, 1876.

*To all whom it may concern:*

Be it known that I, WILLIAM B. S. TAYLOR, of the city and county of New York and State of New York, have invented a certain new and useful Improvement in the Manufacture of Flexible Tubing for Illuminating-Gas and similar purposes; and I do hereby declare that the following is a full and correct description thereof, reference being had to the annexed drawing and to the letters of reference marked thereon.

My invention relates to the manufacture of flexible gas-light tubing for illuminating-gas and similar purposes; and it may be generally stated to consist, first, in making flexible gas-tight tubing by combining in a flexible tube a layer or layers of animal membrane coated or covered with glue or other gelatinous cement, substantially as hereinafter described; and, secondly, in the application and use of glycerine or its equivalent in the manufacture of flexible gas-tight tubing, for the purpose of maintaining in a soft and flexible condition those constituents of the tubing that otherwise would harden and stiffen.

In the manufacture of my improved tubing I use animal membrane, which composes the gut, stomach, bladder, and other animal intestines, and having cleaned and cut them into strips soften the strips with glycerine or with molasses as an equivalent, so as to make them perfectly pliable. They are then ready to be combined with suitable flexible material for flexible tubing.

The effect of the glycerine is to maintain in a soft and flexible condition the animal membrane, and the glue or other gelatinous cement as well, both of which constituents, without the presence of the glycerine, would soon stiffen and become brittle.

The effect of animal membrane and glue is to resist the penetrative action of the gas and its fluids.

The membrane is disposed in the tube in either a double or single helical layer overlapping at the joints. I prefer to use a double layer. It may be placed in this form in a flexible tube, so as to form the inner layer or lining thereof; or it may constitute the covering of a flexible tube; also the inner layer between two layers of other flexible material, the whole constituting a flexible tube.

In applying the membrane to the manufacture of the tubing, besides winding the strips in a helical form, so as to overlap at the edges or joints, I also shirr or plait it to give it capacity for bending freely with the tube.

But the mode in which the tubing may be made will be better undersood by referring to the accompanying drawings.

Figure 1:
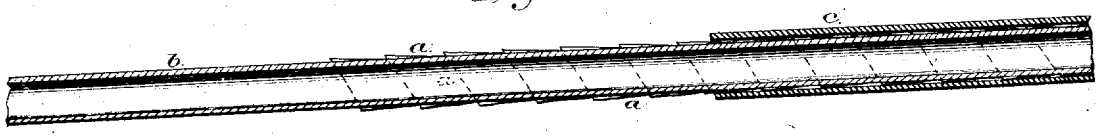
Figure 2:
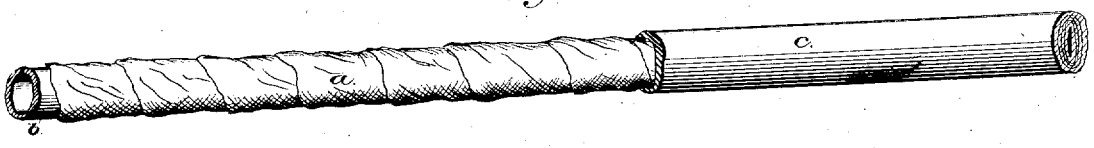

Figures 1 and 2 are views of a tube, in which the membrane *a*, softened and rendered pliable by the means of glycerine or its equivalent, as above provided, is wound and shirred on a tube of india-rubber, *b*, the rubber tube being stretched about one-eighth of its length while the membrane is being wound on it. The shirring is shown exaggerated in Fig. 2. It is a sort of wrinkling of the skin or membrane that is produced by this operation. The membrane is then coated with a solution of glue, or other suitable flexible gelatinous cement, and a covering of sheet rubber or other suitable flexible material, *c*, applied.

If the flexible material of the covering be not elastic, it may be also shirred onto the tube.

Figure 3:
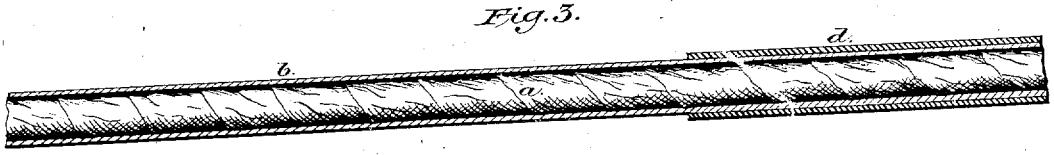
Figure 4:
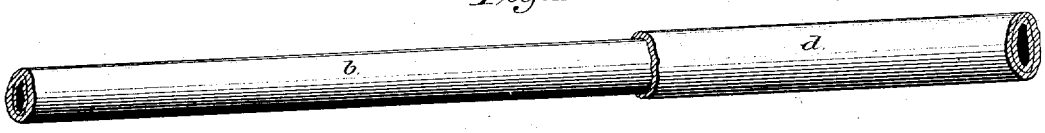

I prefer the form of tubing shown in Figs. 1 and 2; but it may be made as shown in Figs. 3 and 4, by winding the layers of membrane on a mandrel, and removing the mandrel after the membrane is cemented to the outer covering *b*.

The mandrel may be elastic—as, for instance, a tube or round strip of rubber. In that case the shirring of the membrane is produced by stretching the mandrel used as a former, and it is readily removed when the tube is completed by further stretching it, so as to decrease its diameter.

The membrane may be applied to flexible material that is not elastic by plaiting or gathering it as it is wound on; but I prefer to use elastic material as a foundation for the tubing, and also to protect the membrane from abrasion. If desired, the tubing may have an extra covering, as shown at *d*, Figs. 3 and 4.

What I claim as my invention and improvement on flexible tubing for illuminating-gas is—

1. The combination, in a flexible gas-tube, of a layer or layers of animal membrane, coated with glue or other gelatinous cement, substantially as described, and for the purpose of resisting the penetrative action of the gas and its fluids.

2. In the manufacture of flexible tubing for illuminating-gas and similar purposes, the application and use of glycerine, or its equivalent, for the purpose of keeping soft and flexible those constituents of the tubing which otherwise are liable to stiffen or harden, substantially as described.

WM. B. S. TAYLOR.

Witnesses:
CHARLES R. TAYLOR,
DAVID R. WESTERVELT.